United States Patent [19]

Kipphan et al.

[11] Patent Number: 4,637,728

[45] Date of Patent: Jan. 20, 1987

[54] METHOD FOR COLORIMETRICALLY EVALUATING A SHEET PRINTED ON BOTH SIDES THEREOF

[75] Inventors: Helmut Kipphan, Schwetzingen; Gerhard Löffler, Walldorf, both of Fed. Rep. of Germany

[73] Assignee: Heidelberger Druckmaschinen AG, Heidelberg, Fed. Rep. of Germany

[21] Appl. No.: 497,748

[22] Filed: May 25, 1983

[30] Foreign Application Priority Data

May 26, 1982 [DE] Fed. Rep. of Germany ....... 3219743

[51] Int. Cl.[4] .............................................. G01J 3/52

[52] U.S. Cl. .................................... 356/402; 101/211; 356/421

[58] Field of Search ............... 356/402, 406, 407, 421, 356/422, 423, 424, 425, 243; 101/179, 180, 211, 221, 222

[56] References Cited

U.S. PATENT DOCUMENTS 3,890,048 6/1975 Abbondio et al. .................. 356/425
4,469,025 9/1984 Löffler et al. ....................... 356/421
4,494,875 1/1985 Schramm et al. .................. 356/425
4,505,589 3/1985 Ott et al. ............................ 356/425

*Primary Examiner*—F. L. Evans
*Assistant Examiner*—Joel L. Harringa
*Attorney, Agent, or Firm*—Herbert L. Lerner; Laurence A. Greenberg

[57] ABSTRACT

A method of colorimetrically evaluating a sheet printed on both sides thereof by means of a scanning densitometer having a mechanically controlled measuring head which is guided along a print control strip, to be evaluated and which produces a multiplicity of color density values representing color properties of the control strip, which includes assigning respective control strip measurement fields for different colors to respective printed parts on mutually opposite first form and perfector sides of a sheet, and forming a common control strip set out of all of the measurement fields, assigning to the measurement fields abbreviations for each of the respective ink colors in accordance with the colors to be printed, and introducing into a measuring system the color abbreviations assigned to the respective printing colors and to the respective sides of the sheet.

5 Claims, 3 Drawing Figures

METHOD FOR COLORIMETRICALLY EVALUATING A SHEET PRINTED ON BOTH SIDES THEREOF

The invention relates to a method of colorimetrically evaluating a sheet printed on both sides thereof and, more particularly, to such a method wherein a scanning densitometer having a mechanically controlled measuring head is used by being passed along a print control strip to be evaluated and, accordingly, produces a multiplicity of color density values representing the ink properties of the control strip.

So-called densitometers find wide application especially in the printing trade, for colorimetric evaluation of a sheet. They afford the printer, as a result of an evaluation of an ink measurement strip simultaneously printed therewith and of a comparison of the thus found measurement values with desired or nominal values, an objective judgment as to the quality of the printed products as well as a corresponding adjustment of the printing unit with respect to the desired result.

To rationalize the evaluation process, it is desirable to automatize as much as possible the evaluation of the ink measuring strips and the evaluation of the measurement values obtained. For this purpose, various scanning densitometers have become known heretofore which are furnished with a reciprocating measuring head disposed on a bridge spanning the printed sheet, and a corresponding control system and which scan and measure the measurement strips automatically.

In single-side and perfector printing machines both sides of the sheet and web, respectively, are printed in one pass through the machine. If one wished to monitor or control the individual colors of both sides by means of print control strips using conventional measuring devices, it was necessary heretofore to provide separate sets of measurement strips on both sides of the sheet to be printed. This causes no problems in the case of performing the evaluation with the aid of manual densitometers as long as the measurement value is entered at the measurement field per se or in prepared lists. When using an automatic measuring system with data output via a viewing screen and/or printer and/or direct data transmission for the control unit of a printing machine, it is of disadvantage however, if the determined measurement-values cannot be classified by color and additionally issued or delivered with the correct side. This impedes or complicates the handling or manipulation of such measurement devices for the printer.

It is accordingly an object of the invention to provide a method of colorimetrically evaluating a sheet printed on both sides thereof wherein individual colors are monitored on both sides by means of print control strips and the appertaining inking units are controlled in a manner that, when using an automatic measuring system with data delivery or output via a viewing screen and/or printing and/or direct data transmission for the control unit of a printing machine, the measurement values are issued or delivered classified as to color and, additionally, with the correct side.

With the foregoing and other objects in view, there is provided, in accordance with the invention, a method of colorimetrically evaluating a sheet printed on both sides thereof by means of scanning densitometer having a mechanically controlled measuring head which is guided along a print control strip to be evaluated and which produces a multiplicity of color density values representing color properties of the control strip, which comprises assigning respective control strip measurment fields for different colors to respective printed parts on mutually opposite first form and perfector sides of a sheet, and forming a common control strip set out of all of the measurement fields, assigning to the measurement fields abbreviations for each of the respective ink colors in accordance with the colors to be printed, and introducing into a measuring system the color abbreviations assigned to the respective printing colors and to the respective sides of the sheet.

An advantage of the foregoing method according to the invention is that only one control strip set is required for the measuring system employed therein. The measurement locations for the individual colors are exactly defined, and the measurement values are issued or delivered classified as to color and with the correct side. Only one data carrier need be used, with which assurance is provided that the color-oriented data transmission to a control unit is clear, because each color abbreviation can be engaged only once.

Furthermore, the method according to the invention offers the advantage that due to the different side arrangement of the various measurement fields at the front and rear side, the measuring device automatically recognizes whether the first form side or the perfector side is involved, so that it is immaterial whether, initially, the first form or the perfector side is measured.

In accordance with another mode of the invention there is provided a method which includes performing a scanning run for each side of the sheet during which the respective relevant colors are measured, and recording in a common protocol the measurement values of both sides assigned to a printing application, and presenting the color abbreviations and color assignment thereof in at least one of the protocol and a viewing screen.

In accordance with an additional mode of the invention there is provided a method which includes assigning color abbreviations B, C, M and Y for four colors to the measurement fields, an additional abbreviation X to a fifth color, and a further abbreviation Z to a sixth color.

In accordance with a further mode of the invention there is provided a method which includes introducing standard assignments B=black, C=cyan, M=magenta and Y=yellow for a simplified assignment in the case of most frequently used four-color print control strips.

In accordance with a concomitant mode of the invention there is provided a method which includes measuring the second side of the sheet during return travel of the measuring head of the densitometer for accelerating the measuring operation, the sheet being applied to the same sheet application side for measuring the second side.

Other features which are considered as characteristic for the invention are set forth in the appended claims.

Although the invention is illustrated and described herein as embodied in a method of colorimetrically evaluating a sheet printed on both sides thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
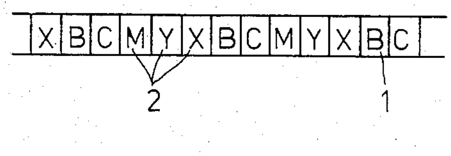
FIG. 1 is a fragmentary view of a print control strip.

Referring now to the drawing and first, particularly, to FIG. 1 thereof, there is shown a fragment of a print control strip 1 wherein individual measurement fields for respective colors are identified by letters B, C, M, Y and X. These abbreviations repeat over the length of the print control strip 1 over and over again.

Figure 2:
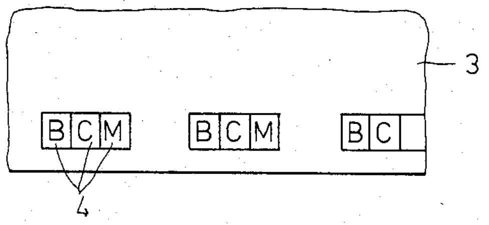
FIG. 2 is a plan view of measurement fields on a first form side of a sheet.

In FIG. 2 an edge of a printed sheet 3 is shown, in fact only the first form side thereof. In accordance with the colors to be printed thereat, only the measurement fields 4 with the color abbreviations B, C, and M are provided. The corresponding colors, black, cyan and magenta can be involved thereat.

Figure 3:
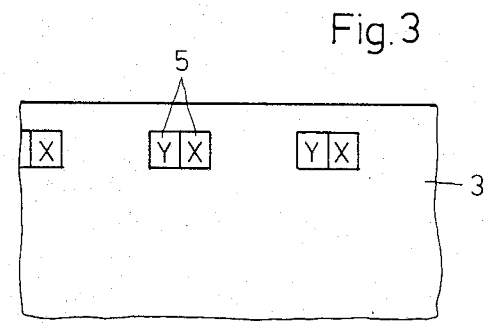
FIG. 3 is a plan view of measurement fields on a perfector side of a sheet.

FIG. 3 shows the perfector side of the sheet 3, on the edge of which, likewise, parts of the print control strip are printed. The measurement fields 5 which are represented bear the identification Y and X, of which Y stands for yellow, and X may be provided for a special fifth color. The measurement fields applied to the first form and perfector side consequently form a control strip set with parts of a single print control strip.

We claim:

1. Method of colorimetrically evaluating a sheet printed on both sides thereof by means of a scanning densitometer having a measuring system and a mechanically controlled measuring head which is guided along a print control strip to be evaluated and which provides a multiplicity of color density values representing color properties of the control strip, which comprises assigning respective control strip measurement fields for different colors to respective printed parts on mutually opposite first form and perfector sides of a sheet, and forming a common control strip set out of all of the measurement fields, assigning to the measurement fields abbreviations for each of the respective ink colors in accordance with the colors to be printed, and introducing into the measuring system the color abbreviations assigned to the respective printing colors and to the respective sides of the sheet.

2. Method according to claim 1 which includes performing a scanning run for each side of the sheet during which the respective relevant colors are measured, and noting in a protocol common to both sides of the sheet the measurement values of both sides assigned to a printing application, and presenting the color abbreviations and color assignment thereof in at least one of the protocol and a viewing screen.

3. Method according to claim 1 which includes assigning color abbreviations B, C, M and Y for four colors to the measurement fields, an additional abbreviation X to a fifth color, and a further abbreviation Z to a sixth color.

4. Method according to claim 1 which includes introducing standard assignments B=black, C=cyan, M=magenta and Y=yellow for a simplified assignment in the case of most frequently used four-color print control strips.

5. Method according to claim 1 which includes measuring the second side of the sheet duing return travel of the measuring head of the densitometer for accelerating the measuring operation.

* * * * *